Figure 1:
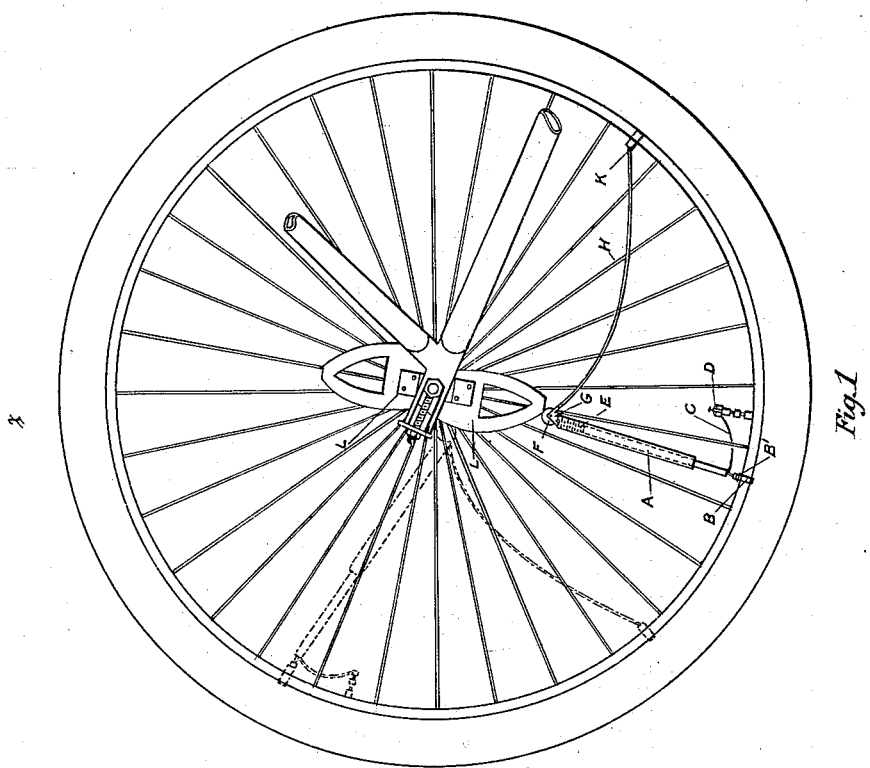

No. 654,634. Patented July 31, 1900.
H. H. HENNING.
AUTOMATIC PUMP FOR PNEUMATIC TIRED WHEELS.
(Application filed Apr. 19, 1900.)

(No Model.)

Witnesses:
W. C. Pinckney
C. Holloway

Inventor
Henry Herbert Henning,
By J. E. W. Owen
Attorney.

THE NORRIS PETERS CO., PHOTO-LITHO., WASHINGTON, D. C.

UNITED STATES PATENT OFFICE.

HENRY HERBERT HENNING, OF BRISBANE, QUEENSLAND.

AUTOMATIC PUMP FOR PNEUMATIC-TIRED WHEELS.

SPECIFICATION forming part of Letters Patent No. 654,634, dated July 31, 1900.

Application filed April 19, 1900. Serial No. 13,408. (No model.)

*To all whom it may concern:*

Be it known that I, HENRY HERBERT HENNING, electrical engineer, residing at Brisbane, in the county of Stanley, in the Colony of Queensland, (whose post-office address is 14 Q. D. Bank Chambers, Adelaide street, in the city of Brisbane,) have invented certain new and useful Improvements in Automatic Pumps for Pneumatic-Tired Wheels; and I do hereby declare the following to be a full, clear, and exact description of the invention, such as will enable others skilled in the art to which it appertains to make and use the same.

It not infrequently happens that a tire punctures at a time when it is most inconvenient to stop and repair the damage, while every vehicle carries or should carry an air-pump for use when the vehicle is stationary. My invention relates, primarily, to an automatic pump devised to overcome the leakage of air caused by any ordinary puncture; but it can also be used for ordinary inflation. I am aware that inventions in this direction have already been made; and my invention has for its object the production of smaller, simpler, and cheaper means for attaining the desired end.

The invention consists of parts readily attached or detached, so that it can be carried in a case or in its place on the wheel ready for immediate use.

My invention consists of a small single-acting air-pump articulated to a clip capable of being slipped over the rim of the wheel and secured in place. The head of the piston-rod is provided with a wheel or roller carried in cheeks pivoted to the rod and fitted with a spring to keep it extended, while it also has a stay articulated to another adjustable clip placed on the rim about one-fifth of the circumference from the other. The pump and stay are placed at an angle on the clips, so that although the clips are placed centrally on the rim, the angle of the pump being greater than the angle of the spokes, the wheel or roller on the head of the piston-rod is always outside the line of spokes. Secured between the frame and the wheel-hub and having its track close to the spokes, but not touching, I provide a cam having a grooved track for the reception of the wheel or roller before mentioned, while the track is otherwise so curved that as the wheel revolves once the pump is given at least two effective strokes and returned, not too rapidly, ready for another stroke. From the pump a tube is led to the inlet-valve of the tire, and interposed is a safety-valve to prevent excessive pressure being put on the tire.

In order, however, that my invention may be clearly understood, I will now describe it, reference being made to the accompanying drawings, in which—

Figure 3:
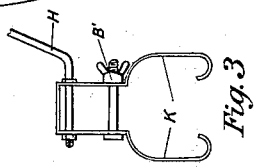
Figure 2:
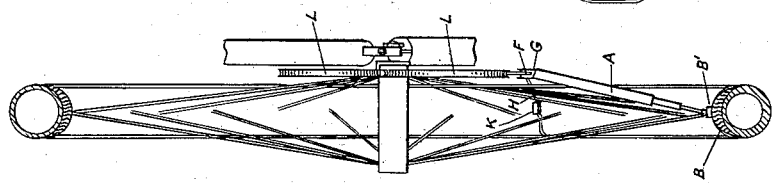

Figure 1 shows a side view of the hind wheel of a bicycle fitted in accordance with my invention and provided with a cam to give two strokes per revolution. A small portion of the frame also is shown and the pump in its extreme positions. Fig. 2 is a section of wheel about line X X, Fig. 1. Fig. 3 is an enlarged view of the stay-rim clip.

It will be seen that the illustrations only show the invention fitted to the hind wheel of a bicycle; but it will be obvious that it is equally applicable to other pneumatic-tired wheels and could readily be fitted without further invention if the application to a bicycle is understood.

A is the air-pump, which may be much smaller in capacity than the ordinary inflation-pump, and it is articulated to a clip B, made to pass over the rim of the wheel and provided with a bolt and thumb-nut B' to fix it when in place.

C is a flexible tube connecting the pump with the inlet-valve of the tire, and interposed is a safety-valve D to prevent overloading the tire.

E is a spring placed between the top of the cylinder and the head of the piston-rod for the purpose of returning the piston-rod after each stroke and so keep the antifriction wheel or roller F on the cam-track. The wheel or roller F is carried in cheeks G, pivoted to the head of the piston-rod and is also pivoted to a stay H, which latter is pivoted to a rim-clip K in such a manner, Fig. 3, as to form a strong lateral support for the pump, besides holding it in position on the track. The pump is set at an angle at the clip B, so that while the rim end of the pump is central the wheel or roller F extends outside the spokes and easily keeps track on the cam.

L is the cam, which may be made in varying forms to give two or more strokes to the pump for each revolution of the wheel. The track I prefer to be grooved, as in Fig. 2, for the reception of the wheel F. I design this cam so that while the compressing stroke is steady the return is somewhat quicker, but not too rapid to cause a jar or rattle, the wheel F being kept up to the track by the spring E, before described. The cam is made so that the track nearly touches the spoke, while it is secured in position by being held between the outer cone or collar on the main bearing-spindle and the frame or between the outside of the frame and the nut, or it may be held in any other suitable manner, the aim being to secure it in a fixed position.

At the bottom of the pump I place a hook, and on the bottom of the spring-case I put a pin, so that the pump may be compressed so that the wheel F does not touch the track and the hook placed over the pin (not shown on plans) to hold the case down and so keep the pump out of gear. As the wheel revolves (when the pump is in gear) the wheel F on the piston-rod head travels along the track on the cam, compressing the piston and returning it alternately, thereby pumping air continually, and so long as the pressure in the tire is less than the proper amount the air is delivered into the tire; but on the pressure exceeding the safety limit the safety-valve lifts each stroke and allows the surplus air to escape until the pressure in the tire falls again.

What I claim, and desire to secure by Letters Patent of the United States, is—

A single-acting air-pump connected to the inlet-valve of the tire and having a safety-valve interposed, said pump articulated to a clip fitting over the rim, a spring interposed between the top of the pump-case and the end of piston-rod, end of rod provided with wheel carried in cheek hinged to rod and to a stay articulated to a clip fitting over the rim, a cam secured to the frame and having a track grooved for the reception of the wheel on end of piston-rod as herein described and illustrated in the accompanying drawings.

In testimony that I claim the foregoing as my invention I have signed my name in presence of two subscribing witnesses.

HENRY HERBERT HENNING.

Witnesses:
CHARLES S. BERNAY,
TH. MURPHY.